United States Patent [19]

Kessler et al.

[11] Patent Number: 4,964,194
[45] Date of Patent: Oct. 23, 1990

[54] APPARATUS AND METHOD FOR DISJOINTING THE THIGHBONES OF POULTRY CARCASSES

[75] Inventors: Lawrence J. Kessler, 517 Broad Ave. NW., Canton, Ohio 44708; Larry I. Bolitho, 8480 Milmonta St. NW., Massillon, Ohio 44646

[73] Assignees: L. J. Kessler, Canton; L. I. Bolitho, Massillon; Park Poultry, Inc., Canton, all of Ohio ; part interest to each

[21] Appl. No.: 469,750

[22] Filed: Jan. 17, 1990

Related U.S. Application Data

[63] Continuation of Ser. No. 342,576, Apr. 24, 1989, abandoned.

[51] Int. Cl.$^5$ .............................................. A22C 21/00
[52] U.S. Cl. ........................................... 17/11; 17/46
[58] Field of Search .......................... 17/11, 46, 16, 52

[56] References Cited

U.S. PATENT DOCUMENTS

| | | | |
|---|---|---|---|
| 3,548,448 | 12/1970 | Vertegaal | 17/11 |
| 3,744,087 | 7/1987 | Vertegaal | 17/11 |
| 4,097,960 | 7/1978 | Graham | 17/11 |
| 4,184,230 | 1/1980 | Fox et al. | 17/52 |
| 4,480,353 | 11/1984 | Martin et al. | 17/11 |
| 4,709,448 | 12/1987 | McGuire et al. | 17/11 |
| 4,739,539 | 4/1988 | Simmons | 17/11 |

*Primary Examiner*—Willis Little

*Attorney, Agent, or Firm*—Michael Sand Co.

[57] ABSTRACT

An apparatus for automatically disjointing the thighbones of poultry carcasses at the proximal end of the bones. Poultry carcasses are suspended from a conveyor chain which carries the carcasses to similar first and second thigh-disjointing stations of the apparatus. Each station includes front and rear vertical shafts are rotatably mounted on opposite sides of the conveyor chain. A sprocket rotatably driven by the chain is mounted on the front shaft, and front and rear turntables are mounted on the front and rear shafts, respectively. A plurality of disjointing rods are mounted on the front turntable and a plurality of guide members are mounted on the rear turntable. The sprocket rotates the front shaft which in turn rotates the front turntable for synchronizing the rotational movement of the rods with the linear movement of the conveyor. A pulley assembly operatively connects the front and rear shafts for rotating the rear shaft, which in turn rotates the rear turntable and guide members in a direction opposite to and in synchronization with the front turntable and disjointing rods. The carcasses are automatically carried toward to the first disjointing station and are received by the rotating guide members which stabilize and position the carcasses with respect to the rotating rods. The rods engage and apply pressure to the thigh area of the trailing legs of the carcasses to disjoint the thighbones. The conveyor then carries the carcasses downline toward the second disjointing station where the thighbones of the leading legs are disjointed.

27 Claims, 4 Drawing Sheets

APPARATUS AND METHOD FOR DISJOINTING THE THIGHBONES OF POULTRY CARCASSES

This application is a continuation of application Ser. No. 07/342,576, filed Apr. 24, 1989 now abandoned.

BACKGROUND OF THE INVENTION

1. Technical Field

The invention relates to apparatus and methods for processing poultry and in particular to an apparatus and method for disjointing the legs of poultry. More particularly, the invention relates to such an apparatus and method for automatically disjointing the thighbones of chicken carcasses at the proximal end of the bones.

2. Background Information

Heretofore, most chicken processing plants exclusively have used laborers to manually pop or disjoint the thighbones of chicken carcasses in order to meet the individual needs of certain of their customers. More particularly, fast-food carryout restaurants want the thighbones of the chickens, which they purchase for subsequent preparation and sale to consumers, disjointed or popped out of their sockets at the proximal end of the bone. Failure to do so results in uneven cooking of the thigh meat caused by blood pooling in the thighbone socket. These fast-food restaurants require that the thigh-popping operation be carried out at the processing plant since they compete for business in labor-intensive industries, where allotting labor for disjointing the thighbones of chickens after they are received from a processing plant is economically inefficient.

In order to effectively meet such demands, it has become necessary for certain chicken processing plants to increase automation and reduce labor costs. Thus, the only known previous method of disjointing chicken legs, that is manual labor, is unfeasible in today's competitive market. The unfeasibility of this method is due to its labor-intensive nature, and more specifically because it is an operation that requires extra personnel, is very time consuming and tiring for such personnel to perform, and therefore yields unefficient results.

Thus, the need exists for an apparatus and method for automatically disjointing the thighbones of chicken carcasses at the proximal end of the bones during the usual automated processing of the chickens without interfering with other processing operations.

SUMMARY OF THE INVENTION

Objectives of the present invention include providing an apparatus and method for disjointing thighbones of poultry carcasses at the proximal end of the bones, which is entirely automatic and can be incorporated into a poultry processing plant without interfering with other automated processing operations.

Another objective of the invention is to provide such an apparatus and method for disjointing thighbones of poultry carcasses in which the thighbones can be effectively disjointed without excessively mutilating the poultry carcasses and interfering with other processing operations.

A further objective of the invention is to provide such an apparatus and method in which a large number of poultry carcass thighbones can be disjointed in a relatively short time period without manually manipulating the poultry carcasses.

Still another objective of the invention is to provide such an apparatus and method which positively and automatically stabilizes and positions the poultry carcasses and retains the legs thereof in proper position for disjointing, without manual manipulation of the carcasses once the carcasses are placed on a conveyor at the processing line.

A still further objective of the invention is to provide such an apparatus and method in which disjointing of the thighbones of the poultry carcasses will enable the thigh meat of the carcasses to be cooked more evenly.

Still another objective of the invention is to provide such an apparatus and method for disjointing poultry carcass thighbones which can be easily operated and accomplished by a minimal number of workers, which apparatus is easy to clean and maintain, and which is durable in use and relatively inexpensive to manufacture and install in comparison to the cost of the manual labor heretofore required for such procedures.

These objectives and advantages are obtained by the apparatus of the present invention for automatically disjointing the thighbones of poultry carcasses at the proximal end of the bones, including conveyor means for carrying the poultry carcasses in a certain direction, rod means synchronized with the conveyor means for disjointing the thighbones, guide means synchronized with the conveyor means for stabilizing and positioning the poultry carcasses with respect to the rod means, and means for rotating the rod means and the guide means in opposite directions, so that the rod means disjoints the thighbones of the poultry carcasses as the carcasses are carried past the rod means by the conveyor means.

The objectives and advantages are further obtained by the method of the invention for automatically disjointing the thighbones of poultry carcasses at the proximal end of the bones, including the steps of suspending a plurality of the carcasses at uniformly spaced locations on a conveyor, linearly conveying the carcasses at a generally constant speed toward a thigh-disjointing disjointing station, stabilizing and positioning the carcasses with respect to a plurality of disjointing rods located at the station, disjointing the thighbones of the carcasses, and conveying the carcasses away from the thigh-disjointing station after disjointing the thighbones of the carcasses.

BRIEF DESCRIPTION OF THE DRAWINGS

A preferred embodiment of the invention, illustrative of the best mode in which applicants have contemplated applying the principles, is set forth in the following description and is shown in the drawings and is particularly and pointed out and set forth in the appended claims.

FIG. 5 is a greatly enlarged fragmentary perspective view of a pair of the guide members of the present invention;

Similar numerals refer to similar parts throughout the drawings.

DESCRIPTION OF THE PREFERRED EMBODIMENT

Figure 1:
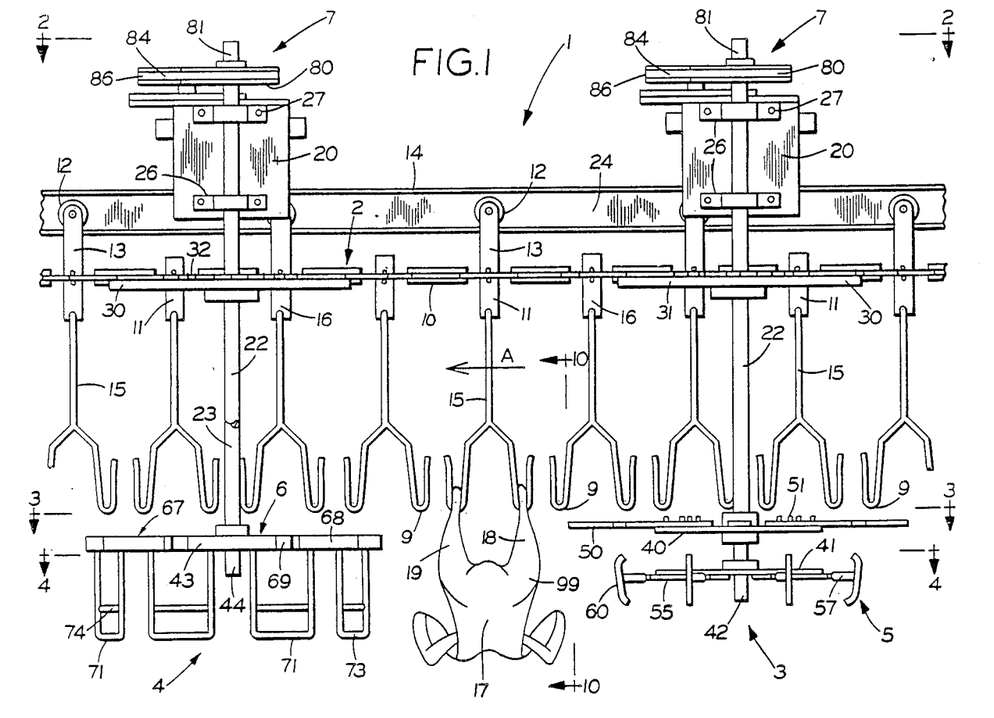
FIG. 1 is a fragmentary generally diagrammatic, front elevational view of the apparatus of the present invention, with portions broken away, showing a chicken carcass suspended from a usual processing line conveyor subsequent to having the thighbone of its trailing leg disjointed and prior to having the thighbone of its leading leg disjointed.

The poultry carcass thighbone disjointing apparatus of the present invention is indicated generally at 1, and is shown particularly in FIG. 1. Apparatus 1 is suitable for disjointing the thighbones of poultry carcasses, and in particular is intended to be used for disjointing the thighbones of broiler carcasses in a poultry processing plant.

Thighbone disjointing apparatus 1 comprises a conveyor and first and second thighbone disjointing stations, indicated generally at 2, 3 and 4, respectively. Each disjointing station 3 and 4 includes as its main components, a plurality of disjointing rods, a plurality of guide members, and a pulley assembly, indicated generally at 5, 6 and 7, respectively (FIG. 1). FIG. 1 shows disjointing rods 5 of first station 3 with distant parts, including guide members 6 of the first station, removed for clarity. FIG. 1 also shows guide members 6 of second disjointing station 4 with foreground parts, including disjointing rods 5, removed for clarity.

Figure 2:
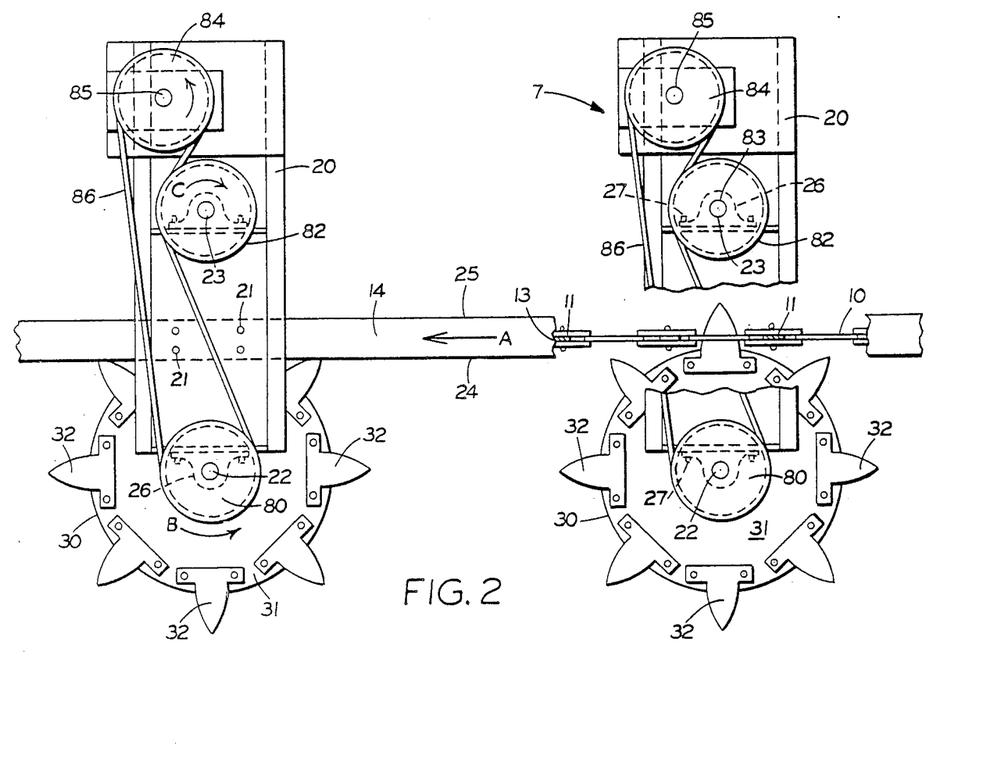
FIG. 2 is an enlarged fragmentary top plan view, with portions broken away and in section, looking in the direction of arrows 2—2, FIG. 1.

Conveyor 2 is a usual type of power-driven conveyor presently used in broiler processing plants and includes a chain 10 having a plurality of brackets 11 mounted thereon at regularly spaced locations (FIGS. 1 and 2). A roller assembly 12 of a type well-known in the art is mounted on an upper end 13 of alternating ones of brackets 11 and is movably mounted on an elevated track 14 for movably suspending chain 10 from the track. A generally Y-shaped inverted hanger 15 having a pair of bent ends 9 is suspended from a lower end 16 of each bracket 11 for suspending broiler carcasses 17 from conveyor 2. Chain 10 is driven by any suitable power source (not shown), such as an electric motor and gear assembly.

Since first and second thighbone disjointing stations 3 and 4 are substantially similar in construction and operation, only first disjointing station 3 will be described in detail herein. A generally rectangular-shaped support frame 20 is mounted on top of conveyor track 14 by a plurality of usual fasteners 21 (FIGS. 1 and 2). A pair of vertical shafts 22 and 23 are rotatably mounted on support frame 20 in an aligned spaced relationship, adjacent to and outwardly of a front and a rear side 24 and 25, respectively, of conveyor track 14. More specifically, each shaft 22 and 23 is rotatably suspended from support frame 20 by a pair of vertically spaced pillow block bearings 26 which are attached to the support frame by fasteners 27.

It is understood that other types of support frames and bearings can be used for rotatably suspending shafts 22 and 23 from conveyor 2 without effecting the overall concept of the invention.

A driven sprocket 30 is fixed on each front shaft 22 and includes a circular plate 31 having a plurality of uniformly circumferentially spaced, radially extending teeth 32 bolted thereto (FIGS. 1 and 2). Teeth 32 are engaged by spaced lengths of chain 10 for rotatably driving sprocket 30 and attached shaft 22.

Figure 3:
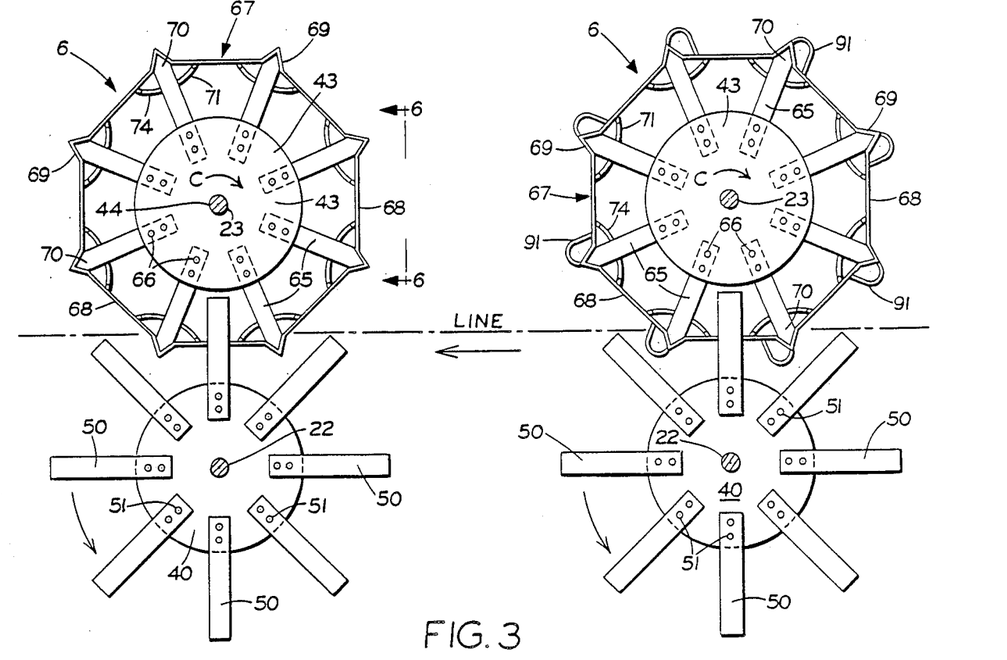
FIG. 3 is an enlarged sectional view taken on line 3—3, FIG. 1.
Figures 4, 5, 6:
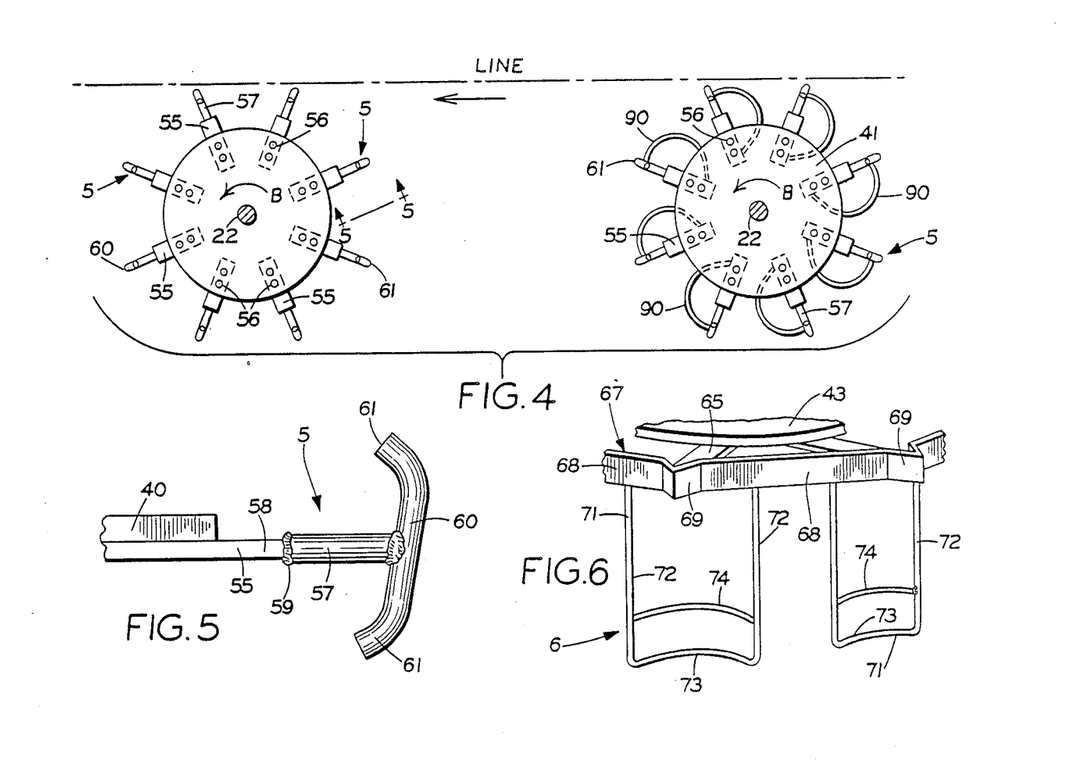
FIG. 4 is an enlarged sectional view taken on line 4—4, FIG. 1.
FIG. 5 is a greatly enlarged fragmentary side view of one of the disjointing rods of the apparatus of the invention.

An upper turntable 40 and a lower turntable 41 are fixed in a vertically spaced relationship to each other and to sprocket 30 on a lower end 42 of front shaft 22 (FIGS. 1, 3 and 4). A turntable 43 is fixed on a lower end 44 of rear shaft 23, and is generally aligned with upper turntable 40 of front shaft 22.

A plurality of uniformly circumferentially spaced, radially extending arms 50 are mounted on upper turntable 40 by fasteners 51, for separating and positioning the legs of broiler carcasses 17 with respect to disjointing rods 5, as will be described in greater detail below (FIGS. 1 and 3).

In accordance with one of the main features of the present invention, disjointing rods 5 comprise a plurality of uniformly circumferentially spaced, radially extending plates 55 mounted on lower turntable 41 by fasteners 56 (FIGS. 1 and 4). A generally T-shaped rod 57 is attached to an outer end 58 of each plate 55 by a weld 59, so that a cross member 60 of rod 57 having bent ends 61 extends in a generally vertical direction, and the bent ends 61 thereof extend inwardly toward turntable 40 (FIG. 5).

In accordance with another important feature of the invention, guide members 6 comprise a plurality of uniformly circumferentially spaced, radially extending bars 65 mounted on turntable 43 of rear shaft 23 by fasteners 66 (FIGS. 1, 3 and 6). A generally octagonal-shaped member 67 has a plurality of sides 68 connected by a plurality of V-shaped, outwardly extending vertices 69, and is welded at its vertices 69 to outer ends 70 of bars 65. A generally U-shaped concave member 71 comprised of a pair of spaced, parallel side rods 72 and a pair of arcuate-shaped cross rods 73 and 74 extend between and are attached to side rods 72 in a spaced relationship (FIG. 6). A plurality of concave members 71 are attached to and suspended from octagonal member 67 adjacent to vertices 69, so that each vertice 69 is located between a pair of side rods 72 of its respective concave member 71, for receiving, stabilizing and positioning broiler carcasses 17 with respect to disjointing rods 5.

Still another feature of the invention is pulley assembly 7 which rotates shafts 22 and 23 in opposite directions (FIGS. 1 and 2). Assembly 7 includes a first pulley 80 fixed to an upper end 81 of front shaft 22, a second pulley 82 fixed to an upper end 83 of rear shaft 23, and an idler pulley 84 fixed to an idler shaft 85 which is rotatably mounted on support frame 20 rearwardly of and sidewardly downline from pulley 82 in the direction of arrow A as shown in FIGS. 1 and 2. An endless drive belt 86 captures pulleys 80 and 84 and operatively engages pulley 82 to rotate front and rear shafts 22 and 23 in opposite directions, indicated by arrows B and C, respectively, in FIG. 2, and to synchronize the rotational movement of rear turntable 43 and guide members 6 attached thereto with the linear movement of conveyor 2.

The components of apparatus 1 preferably all are formed of stainless steel for ease of cleaning, except for conveyor track 14, roller assemblies 12 and brackets 11, which are formed of conaway plated chain.

The construction of first thigh disjointing station 3 differs from that of second station 4 only in the following manner. An arcuate-shaped member 90 (FIGS. 4 and 7) is attached to and extends between T-shaped rod 57 and outer end 58 of plate 55 of each disjointing rod 5 of first station 3, for maintaining the leg of broiler carcasses 17 being disjointed at the first station in proper position with respect to the disjointing rods.

In addition, a loop-shaped member 91 (FIGS. 3 and 7) is attached to and extends between each V-shaped vertice 69 and a certain one of its adjacent sides 68 of octagonal member 67 of first station 3, for assisting in maintaining the leg of the broiler carcasses to be disjointed in proper position with respect to disjointing rods 5.

Second disjointing station 4 is located downline on conveyor 2 from first station 3, or in the direction of arrow A as illustrated in FIG. 1. As discussed above, second disjointing station 4 is substantially similar to first station 3 in its construction except for the differences noted immediately above. Also, the operation of second station 4 is substantially similar to the operation of first station 3, except that the components of first station 3 are arranged to disjoint the thighbone of a trailing leg 18 of broiler carcasses 17 (FIGS. 7–9), and the components of second station 4 are arranged to disjoint the thighbone of a leading leg 19 of the broilers, as is described below in the method for disjointing the thighbones of broiler carcasses using apparatus 1.

Figure 8:
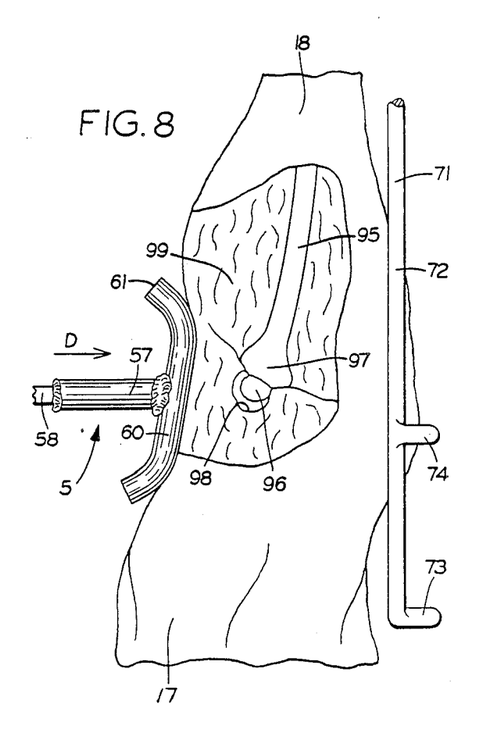
FIG. 8 is a greatly enlarged fragmentary side view of one of the disjointing rods and its corresponding guide member supporting a chicken carcass, with portions of the chicken thigh broken away to expose the proximal end of the thighbone, and showing the disjointing rod beginning to apply pressure to the thigh.
Figure 9:
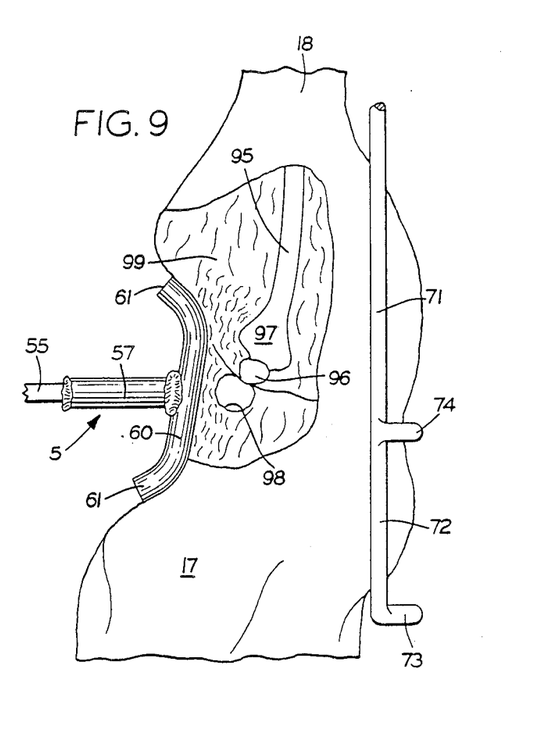
FIG. 9 is a view similar to FIG. 8, showing the disjointing rod popping the proximal end of the thighbone out of its socket.

A usual broiler carcass 17 of the type processed in a poultry plant includes the pair of legs 18 and 19, each of which includes a thighbone 95 having a node 96 formed at a proximal end 97 thereof which fits into a joint socket 98 (FIGS. 8 and 9).

Figure 7:
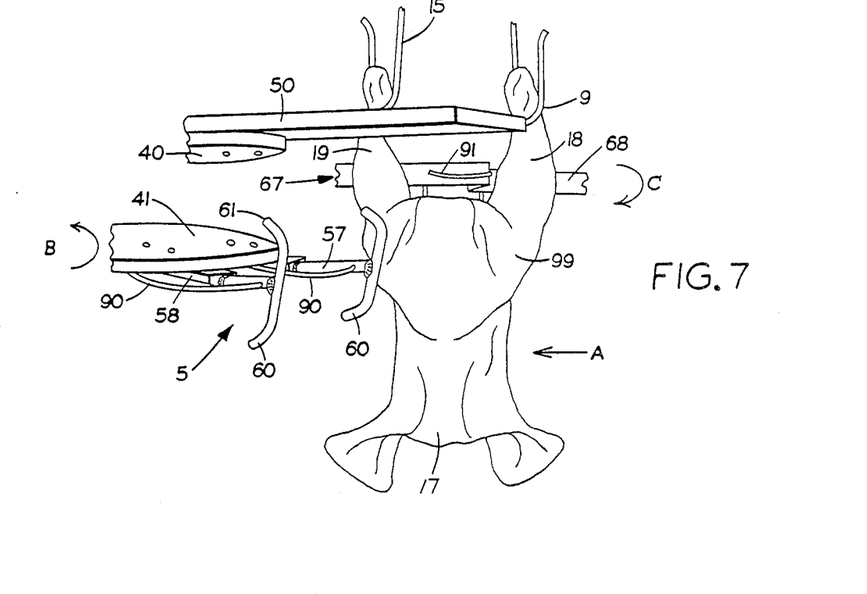
FIG. 7 is a fragmentary perspective view showing a chicken carcass just prior to having the thighbone of its trailing leg disjointed by the apparatus of the invention.

The method for automatically disjointing the thighbones of broiler carcasses 17 is set forth below. A plurality of broiler carcasses 17 are manually suspended from hangers 15 as illustrated in FIG. 1. Legs 18 and 19 of each broiler 17 are slideably engaged in bent ends 9 formed on hanger 15. Conveyor 2 then automatically carries broiler carcasses 17 linearly in the direction of arrow A and toward thighbone disjointing apparatus 1. As a broiler carcass 17 approaches the first thighbone disjointing station 3, the broiler is received in a certain one of the concave U-shaped members 71 of rear turntable 43, which is rotating in the direction of arrow C as shown in FIGS. 3 and 7. The broiler carcass is supported and stabilized by concave member 71, and as turntable 43 continues to rotate in the direction of arrow C in synchronization with the linear movement of conveyor 2 in the direction of arrow A, broiler carcass 17 is positioned with respect to disjointing rods 5 of lower turntable 41 and separating arms 50 of upper turntable 40.

Simultaneous with the rotating movement of turntable 43 and concave member 71 in the direction of arrow C, turntables 40 and 41 and arms 50 and disjointing rods 5, respectively, are rotating in the opposite direction of arrow B as shown in FIGS. 3, 4 and 7. This opposite rotational movement of the turntables of front and rear shafts 22 and 23 is achieved by the arrangement of pulley assembly 7 described above. As turntables 40–41 and 43 and their respective attachments, continue rotating in opposite directions B and C, respectively, and as conveyor 2 linearly moves broiler carcass 17 therebetween, a certain one of the disjointing rods 5 engages a thigh area 99 of trailing leg 18 of the broiler and begins to apply pressure thereto in the direction of arrow D, as shown in FIG. 8. More particularly, generally vertical cross member 60 of disjointing rod 5 engages thigh area 99 and forces the thigh area against cross rod 74 of concave member 71. As rod 5, concave member 71, and broiler 17 continue to move in their respective directions, rod 5 applies enough pressure to thigh area 99 to pop or disjoint node 96 of thighbone 95 out of its socket 98, as illustrated in FIG. 9.

Trailing leg 18 is maintained in proper position during the disjointing process by several components of apparatus 1. More particularly, a certain one of rotating arms 50 maintain legs 18 and 19 of broiler 17 separated. Loop 91, formed on vertice 69 which extends outwardly between broiler legs 18 and 19, prevents trailing leg 18 from slipping past vertice 69 and possibly preventing proper disjointing thereof, and also aids in maintaining leading leg 19 spaced from trailing leg 18. Finally, arcuate member 90 of rod 5 assists in holding trailing leg 18 in position during disjointing thereof.

Figure 10:
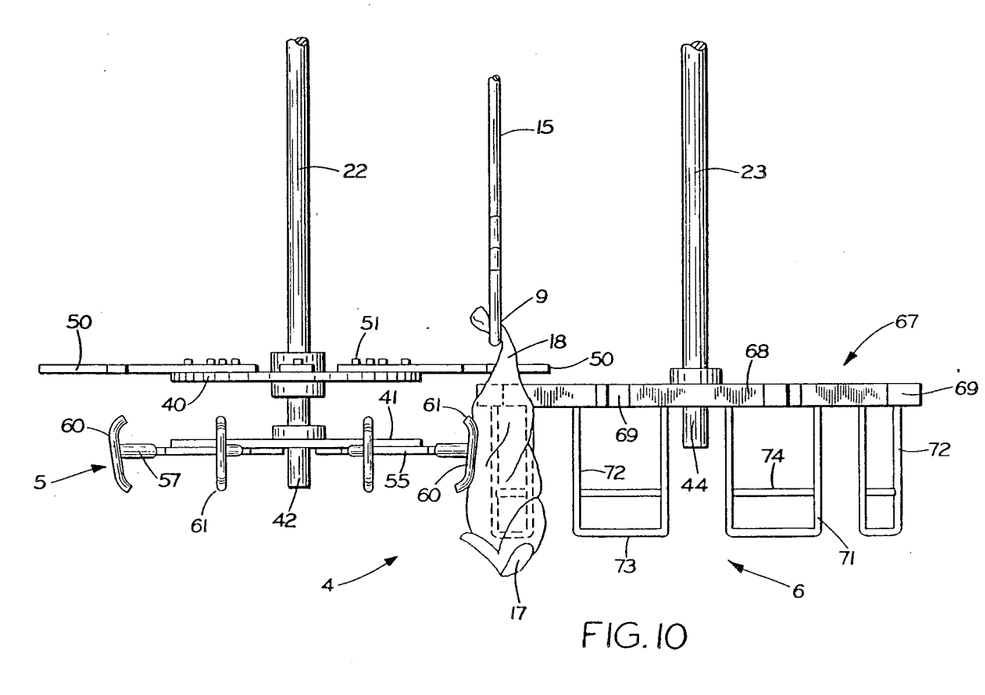
FIG. 10 is an enlarged fragmentary side view of the second thighbone disjointing station of the apparatus looking in the direction of arrows 10–10, FIG. 1, showing one of the guide members in dot-dash lines supporting a chicken carcass as a corresponding one of the disjointing rods begins to apply pressure to the thigh of its leading leg.

After disjointing of the thighbone of trailing leg 18, conveyor 2 carries the broiler downline toward second thighbone disjointing station 4. The above-described disjointing operation is repeated in a similar manner on the leading leg 19 of the broiler, as shown in FIG. 10.

Loops 91 and arcuate members 90 are not required as part of the construction of second disjointing station 4 since the leading leg 19 being disjointed at the second station does not have the same tendency to slip or move out of position during disjointing as does the trailing leg 18.

It should be pointed out that a two-step operation as described above is preferable for disjointing the thighbones one-at-a-time to avoid mutilating the broiler carcass for further operations to be carried out on the processing line. More particularly, the thighbones are disjointed in separate steps to avoid breaking any of the backbones in the broiler, which could interfere with a subsequent breast-splitting operation.

In addition, the arrangement of components of the invention enables just enough pressure to be applied to the thigh area of the carcass to pop the node of the thighbone out of its socket, but not enough pressure to completely destroy the integrity of the proximal thighbone joint which would cause the broiler to hang too loose from its hanger and possibly interfere with subsequent processing operations.

As set forth above, one of the most important features of the present invention is the synchronization of the rotational movement of rods 5 and guide members 6 with the linear movement and spacing of hangers 15, so that guide members 6 properly receive, stabilize and position a broiler carcass with respect to rods 5 as the carcass is carried past the rods by the conveyor. This synchronization and complete automation of the thigh-disjointing apparatus provides for a highly efficient disjointing operation in which a large number of broilers can be processed in a short time period without interfering with or slowing other processing operations.

Another important feature of the invention is the pulley assembly 7 which rotates the front and rear shafts of each station of the apparatus in opposite directions, enabling the guide members to stabilize and position the broilers with respect to the rods so that the rods can apply pressure at the proper point on the broiler thigh providing for a clean, efficient disjointing of the thighbone at its proximal end as the carcass moves at its production rate past apparatus 1.

In summary, the thigh-disjointing apparatus and method can easily be operated and accomplished by a minimal number of workers, and the apparatus itself is easy to clean and maintain, is durable in use and inexpensive to manufacture and install.

Accordingly, the apparatus and method for disjointing poultry thighbones is simplified, provides an effective, safe, inexpensive, and efficient apparatus and method which achieves all the enumerated objectives, provides for eliminating difficulties encountered with prior apparatus and methods, and solves problems and obtains new results in the art.

In the foregoing description, certain terms have been used for brevity, clearness and understanding; but no unnecessary limitations are or do be implied from or beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the apparatus and method for disjointing poultry thighbones is constructed and carried out, characteristics of the apparatus and method, and the advantageous, new and useful results obtained; the new and useful structures, devices, elements, arrangements, parts, combinations, and method steps, are set forth in the appendant claims.

We claim:

1. An apparatus for automatically disjointing the thighbones of poultry carcasses at the proximal end of said bones, said apparatus including:
   (a) conveyor means for carrying the poultry carcasses in a certain direction;
   (b) rod means synchronized with the conveyor means for disjointing the thighbones;
   (c) guide means synchronized with the conveyor means for stabilizing and positioning the poultry carcasses with respect to the rod means; and
   (d) means for rotating the rod means and the guide means in opposite directions, so that the rod means disjoints the thighbones of the poultry carcasses as the carcasses are carried past the rod means by the conveyor means.

2. The apparatus defined in claim 1 in which the conveyor means includes a power-driven chain movably suspended from a track; and in which a plurality of hangers are suspended from the chain at spaced locations for suspending poultry carcasses therefrom.

3. The apparatus defined in claim 2 in which a plurality of brackets are mounted on the chain at uniformly spaced locations; in which a roller assembly is attached to alternating ones of the brackets and is movably mounted on the track; in which each of the poultry hangers is a generally Y-shaped inverted member; and in which the hangers are suspended from the brackets.

4. The apparatus defined in claim 2 in which a first pair of front and rear vertical shafts are rotatably mounted in an aligned spaced relationship adjacent to and outwardly of a front and a rear side of the track of the conveyor, respectively; in which a second pair of front and rear vertical shafts are rotatably mounted in an aligned spaced relationship adjacent to and outwardly of the front and the rear sides of the track, respectively; and in which the second pair of vertical shafts are spaced from the first pair of shafts in the certain direction.

5. The apparatus defined in claim 4 in which a sprocket is mounted on the front shaft of each of the first and second pairs of vertical shafts; and in which the sprockets are operatively engaged with and rotatably driven by the chain of the conveyor for rotating the front shafts.

6. The apparatus defined in claim 5 in which an upper turntable and a lower turntable are mounted on each of the front shafts in a vertically spaced relationship to each other, and below and in a vertically spaced relationship to the sprockets; and in which a turntable is mounted on each of the rear shafts and is generally aligned with the upper turntable of the corresponding front shaft.

7. The apparatus defined in claim 6 in which arm means is synchronized with the conveyor means for separating and positioning the legs of the poultry carcasses with respect to the rod means.

8. The apparatus defined in claim 7 in which the arm means is a plurality of uniformly circumferentially spaced, radially extending arms mounted on each of the upper turntables.

9. The apparatus defined in claim 6 in which the rod means includes a plurality of uniformly circumferentially spaced, radially extending plates mounted on each of the lower turntables; and in which a generally vertically extending rod is attached to an outer end of each of the plates for disjointing the thighbones of the poultry carcasses.

10. The apparatus defined in claim 9 in which each of the poultry carcasses has a pair of legs; in which the pair of legs comprises a leading leg and a trailing leg with respect to the certain direction of movement of the poultry carcasses; and in which the rods of the lower turntable of the first front shaft disjoint the thighbones of the trailing legs of the poultry carcasses, and the rods of the lower turntable of the second front shaft disjoint the thighbones of the leading legs of the carcasses.

11. The apparatus defined in claim 10 in which an arcuate-shaped member is attached to and extends between each of the rods and its respective plate of the lower turntable of the first front shaft, for maintaining the trailing legs of the poultry carcasses in proper position with respect to the disjointing rods.

12. The apparatus defined in claim 6 in which the guide means includes a plurality of uniformly circumferentially spaced, radially extending bars mounted on each of the turntables of the rear shafts; in which a generally octagonal-shaped member formed with a plurality of V-shaped, outwardly extending vertices, is attached at its vertices to an outer end of the bars of each of the turntables of the rear shafts; in which a generally U-shaped concave member comprises a pair of spaced, parallel side rods and a pair of arcuate-shaped cross rods which extend between and are attached to the side rods in a spaced relationship to each other; and in which the U-shaped concave member is attached to and suspended from the octagonal member of each of the turntables of the rear shafts adjacent to each of the vertices, so that each of the vertices is located between the side rods of a respective one of the concave members which receive, stabilize and position the poultry carcasses with respect to the rod means.

13. The apparatus defined in claim 12 in which a loop-shaped member is attached to and extends between each of the V-shaped vertices of the octagonal member and the octagonal member of the turntable of the first rear shaft, for maintaining the trailing legs of the poultry carcasses in proper position with respect to the rod means.

14. The apparatus defined in claim 4 in which the means for rotating the rod means and the guide means in opposite directions is a pulley assembly which operatively connects the front and rear vertical shafts of each of the first and second pairs of shafts.

15. The apparatus defined in claim 14 in which a pulley is attached to an upper end of each of the shafts; in which an idler pulley is rotatably mounted rearwardly of and sidewardly in the certain direction from each of the pulleys of the rear shafts; and in which an endless drive belt captures the pulley of the front shaft and the idler pulley, and operatively engages the pulley of the rear shaft of each of the first and second pairs of shafts, for rotating the front and rear shafts of each of the pairs of shafts in opposite directions and for synchronizing the guide means with the conveyor means.

16. A method for automatically disjointing the thighbones of poultry carcasses at the proximal end of said bones, said method including the steps of:
   (a) suspending a plurality of the carcasses at uniformly spaced locations on a conveyor;
   (b) conveying the carcasses at a generally constant speed and in a certain direction toward a first thigh-disjointing station;
   (c) stabilizing and positioning the carcasses with respect to a plurality of disjointing rods located at the first disjointing station;
   (d) disjointing the thighbones of the trailing legs of the carcasses at the first station;
   (e) conveying the carcasses away from the first station at the generally constant speed and in the certain direction toward a second thigh-disjointing station subsequent to disjointing the trailing legs of the carcasses;
   (f) stabilizing and positioning the carcasses with respect to a plurality of disjointing rods located at the second disjointing station;
   (g) disjointing the thighbones of the leading legs of the carcasses at the second station; and
   (h) conveying the carcasses away from the second station subsequent to disjointing the leading legs of the carcasses.

17. A method for automatically disjointing the thighbones of poultry carcasses at the proximal end of said bones, said method including the steps of:
   (a) suspending a plurality of the carcasses at uniformly spaced locations on a conveyor;
   (b) conveying the carcasses at a generally constant speed toward a thigh-disjointing station;
   (c) stabilizing and positioning the carcasses with respect to a plurality of disjointing rods located at the station;
   (d) disjointing the thighbones of the carcasses; and
   (e) conveying the carcasses away from the thigh-disjointing station after disjointing the thighbones of the carcasses.

18. An apparatus for automatically disjointing the thighbones of poultry carcasses at the proximal end of said bones, said apparatus including:
   (a) conveyor means for carrying the poultry carcasses in a certain direction;
   (b) rod means synchronized with the conveyor means for disjointing the thighbones;
   (c) guide means synchronized with the conveyor means for stabilizing and positioning the poultry carcasses with respect to the rod means; and
   (d) means for moving the rod means toward the guide means so that the rod means disjoints the thighbones of the poultry carcasses as the carcasses are carried past the rod means by the conveyor means.

19. The apparatus defined in claim 18 in which the conveyor means includes a power-driven chain movably suspended form a track; and in which a plurality of hangers are suspended form the chain at spaced locations for suspending poultry carcasses therefrom.

20. The apparatus defined in claim 19 in which a plurality of brackets are mounted on the chain at uniformly spaced locations; in which a roller assembly is attached to alternating ones of the brackets and is movably mounted on the track; in which each of the poultry hangers is a generally Y-shaped inverted member; and in which the hangers are suspended from the brackets.

21. A method for automatically disjointing the thighbones of poultry carcasses at the proximal end of said bones, said method including the steps of:
   (a) suspending a plurality of the carcasses at uniformly spaced locations on a conveyor;
   (b) conveying the carcasses at a generally constant speed and in a certain direction;
   (c) stabilizing and positioning the carcasses with respect to a plurality of disjointing rods;
   (d) using a first disjointing rod to disjoint the thighbone of a first leg of a carcasses;
   (e) subsequently using a second disjointing rod to disjoint the thighbone of a second leg of the carcasses; and
   (f) conveying the carcasses away after the disjointing the first and second legs of the carcass.

22. An apparatus for automatically disjointing the thigh joints of birds in a poultry processing facility, each of said birds having a breast, a back side, and two thighs; said apparatus including means for supporting the birds and conveying them in a machine direction so that a first bird precedes a second bird as they move through the apparatus, said apparatus including a plurality of first members for retaining the breast sides of the birds, a plurality of second members for contacting the thighs of the birds on the back sides of the birds, and actuating means for providing relative movement which moves the first members and the second members toward each other to disjoint the thigh joints of the birds.

23. Apparatus according to claim 22 having a rotating support member, at least some of said members being fixed to said rotating support member.

24. Apparatus according to claim 23 having a driven conveyor chain for moving the birds through the apparatus, and means for transmitting driving forces from the driven conveyor chain to the rotating support member.

25. Apparatus according to claim 22 wherein the first members are positioned to contact the birds where their breasts are connected to their thighs.

26. Apparatus according to claim 22 wherein the second members are positioned to contact the birds where their backs are connected to their thighs.

27. A method of automatically disjointing the thigh joints of birds in a poultry processing facility, each of said birds having a breast side, a back side, and two thighs; said method including the steps of:

(a) supporting the birds and conveying them in a machine direction so that a first bird precedes a second bird as they move through the apparatus;

(b) moving a first member into contact with the bird in a region where the breast in connected to the thigh of its leg;

(c) moving a second member into contact with the bird in a region where its back is connected to its thigh; and (d) providing relative movement which forces said first member and said second member toward each other, said bird being at a position where said relative movement simultaneously disjoints the thigh joint of the bird.

* * * * *